United States Patent Office 3,443,309
Patented May 13, 1969

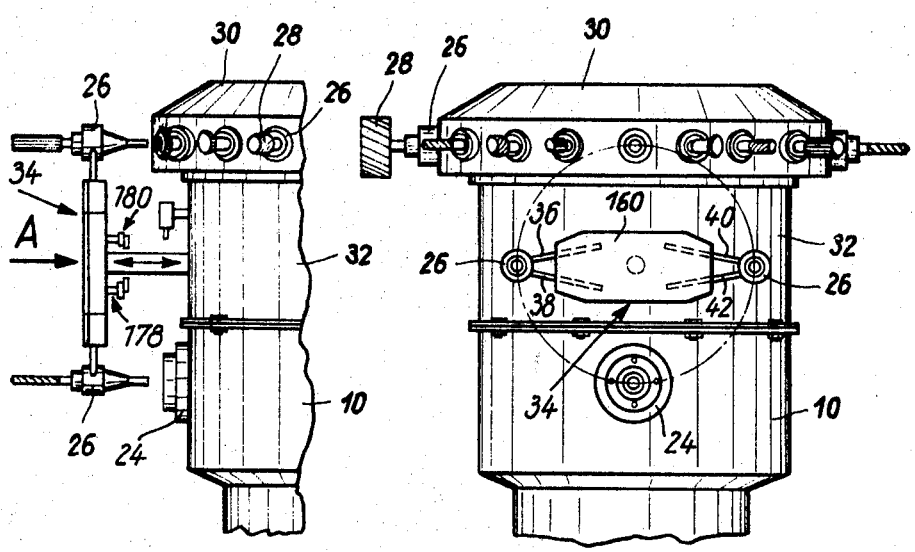

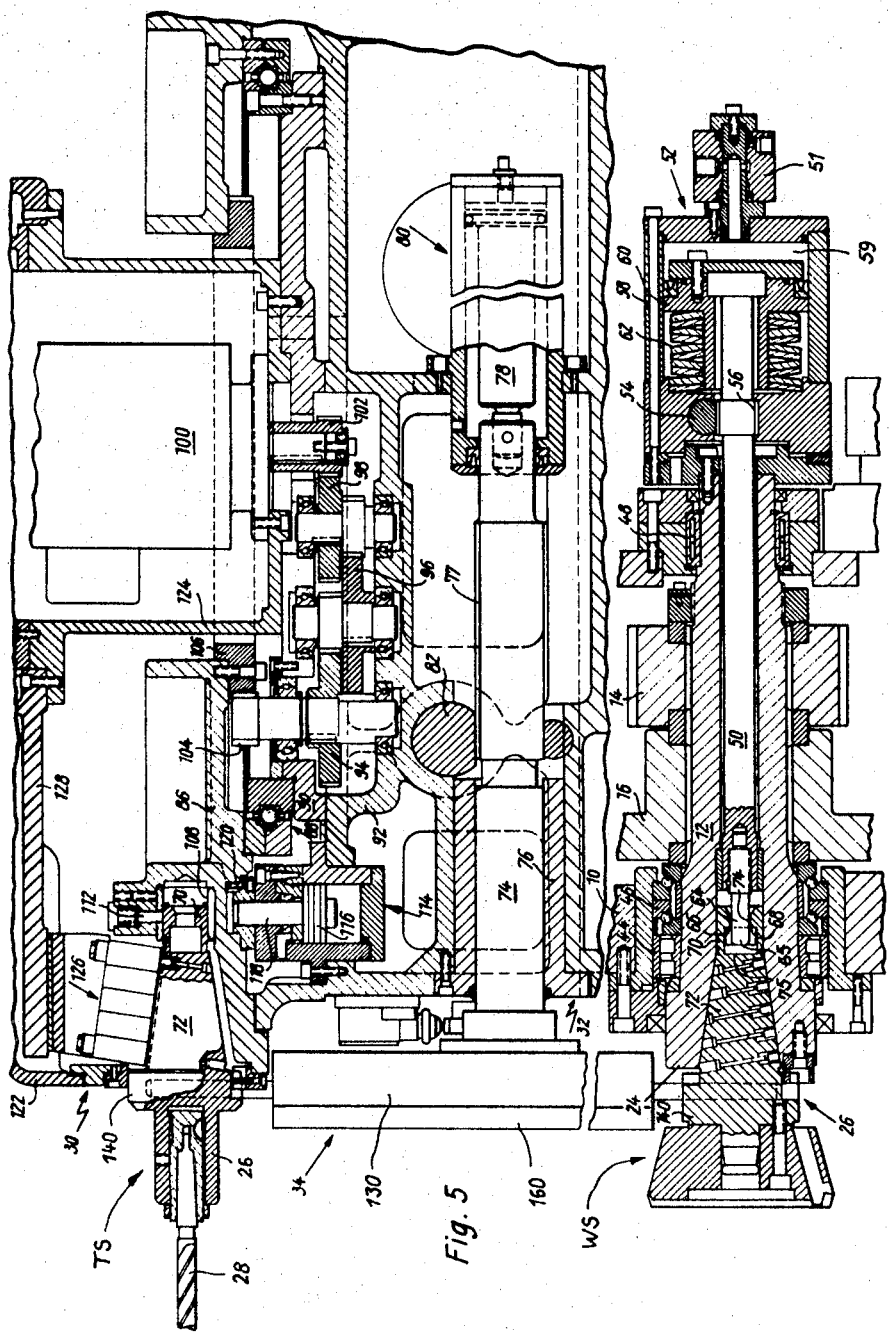

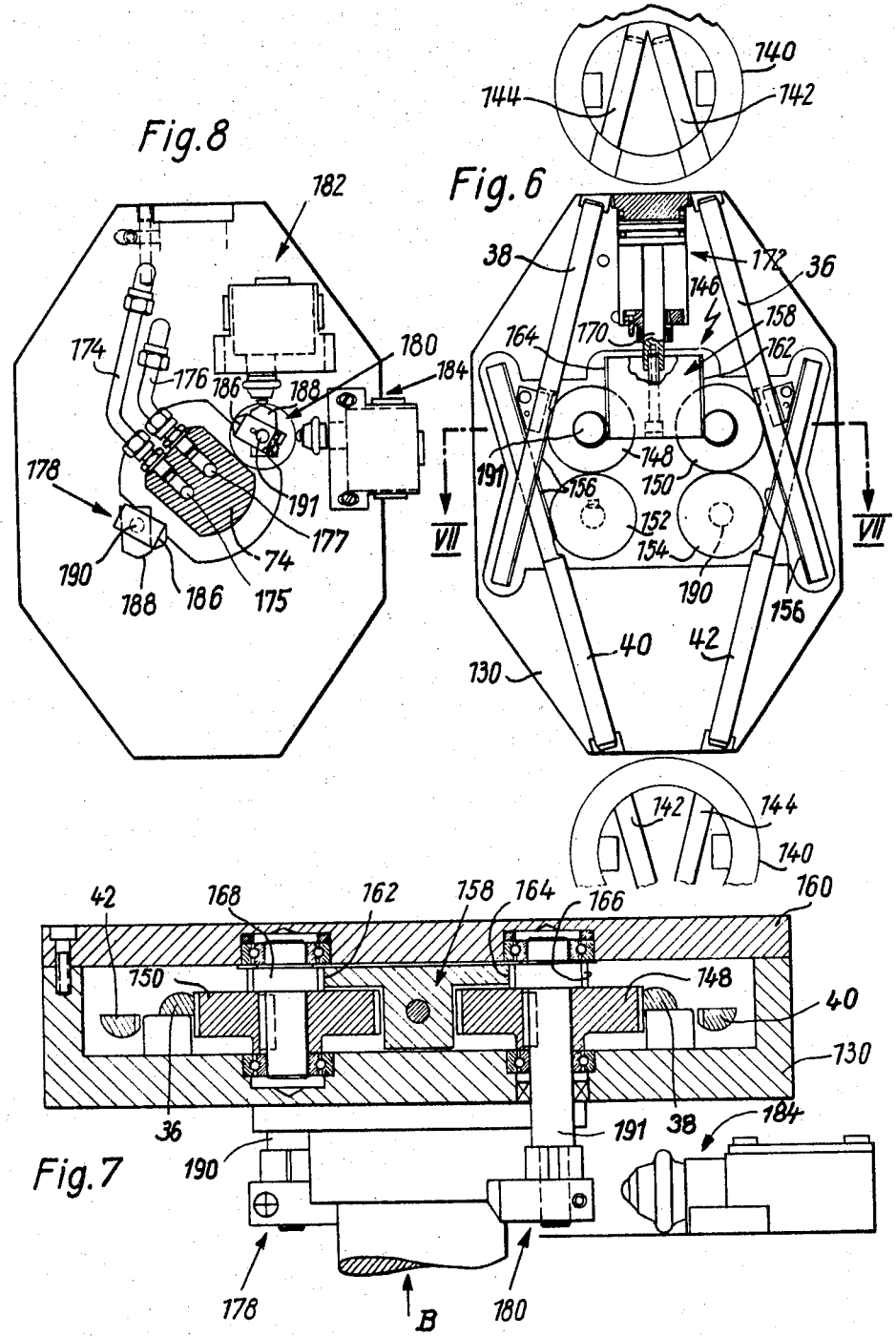

3,443,309
TOOL HOLDER CHANGER
Adolf Huller, Heinz Gundlich, and Joachim Merker, Rottenburg (Neckar), Germany, assignors to Karl Huller GmbH, Ludwigsburg, Wurttemberg, Germany
Filed Dec. 8, 1966, Ser. No. 600,139
Claims priority, application Germany, Dec. 10, 1965, 57,926
Int. Cl. B23q 3/00
U.S. Cl. 29—568     12 Claims

ABSTRACT OF THE DISCLOSURE

A tool holder changer for use in milling machines wherein an indexible carrousel type magazine accommodates a supply of spare tool holders and wherein such tool holders are insertable into the socket of a tool spindle. The changer is rotatable intermediate the magazine and tool spindle and is provided with two pairs of mutually inclined grippers movable substantially radially of the tool holder changer axis to respectively engage or release a tool holder in the magazine and a tool holder in the socket of the spindle. The changer is movable axially to respectively insert or withdraw the tool holders which are engaged by the grippers and is rotatable back and forth through 180 degrees whereby the tool holders which are held by the grippers switch positions.

Background of the invention

The present invention relates to machine tools in general, and more particularly to improvements in milling machines and similar machine tools wherein an indexible magazine accommodates a supply of spare tool holders which must be transferred to a working station for engagement with workpieces. Such machine tools normally comprise a tool holder changer which serves to transfer selected tool holders from the magazine to the working station and vice versa. As a rule, the tool holder changer is provided with two gripping devices in the form of tongs whose jaws are movable toward and away from each other to respectively straddle and release a tool holder. A serious drawback of such changers is that their tongs require too much room and that, therefore, the tool holders must be mounted on the magazine at a considerable distance from each other in order to allow for unimpeded movement of jaws between open and clamping positions. Consequently, and if the machine tool is to utilize a large number of different tools each of which is mounted in a separate tool holder, the magazine for spare tool holders must be very large, bulky, heavy and must be indexed by a heavy-duty mechanism.

Accordingly, it is an important object of the present invention to provide a novel and improved tool holder changer which comprises very simple, compact and lightweight gripping devices capable of properly engaging, removing and/or inserting tool holders which are closely adjacent to each other.

Another object of the invention is to provide a tool holder changer which is constructed and assembled in such a way that a single drive suffices to operate its gripping devices and which renders it possible to utilize a compact and lightweight magazine capable of accommodating a large number of closely adjacent spare tool holders.

A further object of the invention is to provide a tool holder changer whose utilization in a milling machine or another machine tool necessitates minimal changes in the design of tool holders.

An additional object of the instant invention is to provide a tool holder changer which can be operated in a fully automatic way by resorting to simple, compact and inexpensive control devices.

Still another object of the invention is to provide a novel drive which may be utilized to operate the gripping devices of our improved tool holder changer.

A concomitant object of the invention is to provide a tool holder changer which can be installed in conventional machine tools.

Summary of the invention

The invention is embodied in a machine tool, particularly in a milling machine, which comprises a support, a magazine having a plurality of preferably equidistant sockets and being indexible with reference to the support to move the sockets to and from a transfer station, an additional socket provided at a second station which is spaced from the transfer station and preferably accommodates a tool spindle which carries and can transmit torque to the additional socket, a plurality of tool holders each accommodated in one of the sockets and each having a portion receivable in the addition socket (as a rule, one of the tool holders is held in the additional socket), a tool holder changer mounted on the support between the two stations for rotation about a predetermined axis between two positions angularly spaced by 180 degrees, the two stations being disposed diametrically opposite each other with reference to the tool holder changer axis, first and second gripping devices movably supported by the housing of the tool holder changer, drive means for moving the gripping devices substantially radially of the tool holder changer axis so that each such gripping device can be moved into and away from supporting engagement with a tool holder at one of the two stations in each of the two positions of the changer, means for rotating the tool holder changer between such positions, and means for reciprocating the tool holder changer in the direction of its axis to respectively introduce and remove tool holders from the sockets at the two stations while such tool holders are engaged by the respective gripping devices.

In accordance with a presently preferred embodiment of the invention, each gripping device comprises a pair of mutually inclined elongated rod-shaped grippers or arms which are extendable into and withdrawable from holes provided in the tool holders. When the grippers move outwardly, their outer ends approach each other.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

Short description of the drawing

FIG. 3 is a fragmentary side elevational view of the structure shown in FIGS. 1 and 2 with the tool holder changer illustrated in a different position in which its grippers support two tool holders;

FIG. 4 is a view as seen in the direction of arrow A in FIG. 3 but showing the tool holder changer during movement to switch the positions of the two tool holders;

FIG. 5 is an enlarged fragmentary vertical sectional view of the machine tool, substantially as seen in the direction of arrows from the line V—V of FIG. 2, showing the units which effect movements of the tool holder changer with reference to the remainder of the machine tool;

FIG. 6 is an enlarged vertical sectional view of the tool holder changer, substantially as seen in the direction of arrows from the line VI—VI of FIG. 1;

FIG. 7 is an enlarged horizontal section as seen in the direction of arrows from the line VII—VII of FIG. 6; and FIG. 8 is a smaller-scale rear elevational view of the tool holder changer as seen in the direction of arrow B in FIG. 7.

*Description of the preferred embodiments*

Figure 1:
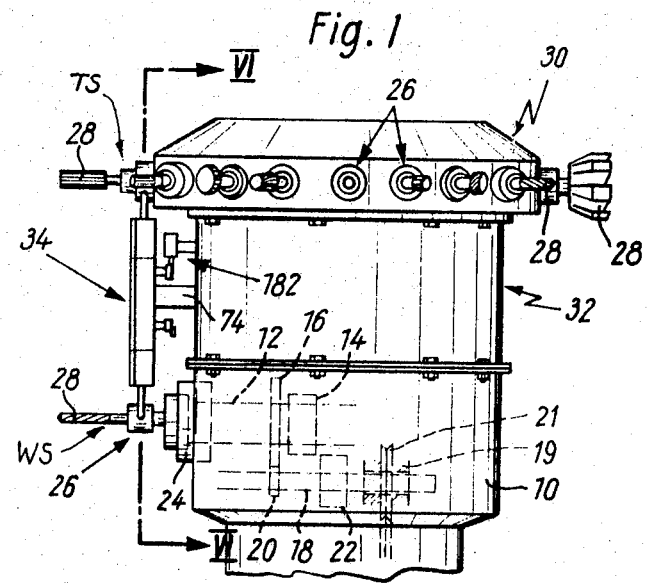
FIG. 1 is a side elevational view of a portion of a machine tool which embodies the improved tool holder changer, the latter being shown in a position in which its grippers engage two tool holders.
Figure 2:
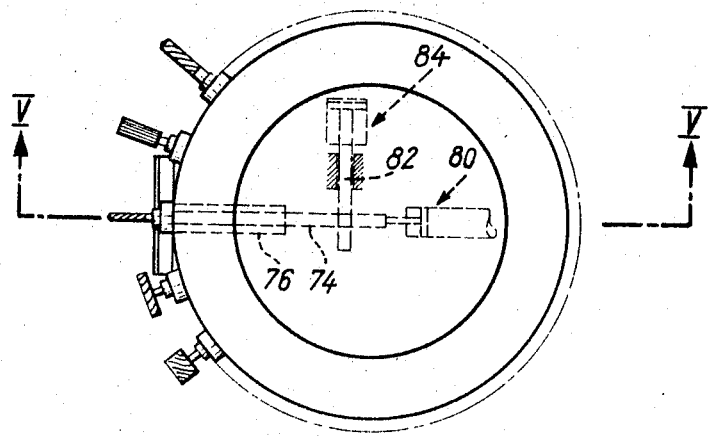
FIG. 2 is a top plan view of the structure shown in FIG. 1.

Referring first to FIGS. 1 to 4, there is shown a portion of a milling machine which comprises a headstock 10 for a horizontal tool spindle 12. The drive for the spindle 12 comprises a transmission including a horizontal output shaft 18 which is reciprocable in its bearings 19 and is driven by a pulley 21. The output shaft 18 carries gears 20, 22 which can respectively mesh with gears 16, 14 on the tool spindle 12 to rotate the latter at different speeds including a higher speed when the gear 22 is shifted into mesh with the gear 14.

The spindle 12 comprises a receptacle or socket 24 which can accommodate one tool holder 26 at a time. The socket 24 extends from the headstock 10 and occupies a working station WS located at a level below a transfer station TS. The clamping means for retaining a tool holder 26 in the socket 24 will be described in connection with FIG. 5. The headstock 10 carries a cylindrical support 32 for a relatively small indexible carrousel-type tool holder magazine 30 which accommodates a series of annularly arranged closely adjacent spare tool holders 26. Each tool holder 26 has a chuck which holds a different tool 28. The indexing mechanism for the magazine 30 will be described in connection with FIG. 5. The support 32 carries certain elements of a programming system which is adapted to arrest the magazine 30 in any one of a series of angular positions in each of which a selected tool holder 26 occupies the transfer station TS above the tool holder 26 which is mounted in the socket 24 of the tool spindle 12 at the working station WS. A suitable programming system is disclosed and claimed in the aforementioned copending application Ser. No. 587,122 of Grundlich.

Our present invention resides mainly in the provision of a novel tool holder changer 34 which is mounted on the support 32 and serves to transfer tool holders 26 from the transfer station TS into the socket 24 at the working station WS and vice versa, normally in such a way that withdrawal of a tool holder 26 from the socket 24 takes place simultaneously with withdrawal of another tool holder 26 from the magazine 30 and, once the thus withdrawn tool holders are caused to switch positions in response to rotation of the tool holder changer 34 through an angle of 180 degrees, the tool holders are respectively introduced into the magazine 30 and socket 24. The operation of the tool holder changer 34 is automatic and its housing including a base or pan 130 and a cover or lid 160 is movable radially away from and toward the support 32 to respectively withdraw two tool holders 26 and to thereupon reinsert the tool holders subsequent to switching. The stations TS and WS are located diametrically opposite each other with reference to the horizontal axis about which the changer 34 rotates back and forth through angles of 180 degrees.

The tool holder changer 34 comprises two gripping devices which respectively include pairs of grippers or arms 36, 38 and 40, 42 shown in FIG. 4 and movable substantially radially toward and away from the horizontal axis of rotation of the changer. The grippers 36–42 are normally retracted into the interior of the pan 130 or are retracted sufficiently to be disengaged from the tool holder 26 in the socket 24 at the working station WS and also from the tool holder 26 which occupies the transfer station TS. When the two tool holders are to switch positions, the grippers 36–42 are caused to move outwardly and to engage the respective tool holders in a manner as shown in FIG. 1. In the next step, the entire tool holder changer 34 is caused to move radially and away from the support 32 to take the position shown in FIG. 3. The two tool holders 26 are then separated from the socket 24 and magazine 30. In the next step, the tool holder changer 34 is caused to make a half turn whereby it travels through and beyond the intermediate position shown in FIG. 4. In the next-following step, the tool holder changer 34 returns toward the support 32 to introduce one of the tool holders 26 into the magazine 30 and to insert the other tool holder 26 into the socket 24. In the last step, the grippers 36–42 are withdrawn radially inwardly so that the tool holder 26 which has been inserted into the socket 24 can rotate with the tool spindle 12.

Prior to a detailed description of the drive mechanism which reciprocates the grippers 36–42, reference will be had to FIG. 5 showing the parts which are accommodated in the headstock 10, support 32 and magazine 30 and include means which rotate and reciprocate the tool holder changer 34.

The total spindle 12 is rotatable in three antifriction bearings including a roller bearing 44, a ball bearing 46 and a needle bearing 48. The aforementioned clamping means for the tool holder 26 which is inserted into the socket 24 of the tool spindle 12 at the station WS comprises a piston rod 50 which is reciprocable and rototable in an axial bore of the spindle 12 and is connected with a piston 60 forming part of a hydraulic reciprocating unit 52. The piston rod 50 extends rearwardly beyond and is rotatable about the axis of the tool spindle 12 by a hydraulically operated rack 54. The latter makes right angles with the spindle 12 and meshes with a pinion 56 on the piston rod 50. The cylinder and piston means for reciprocating the rack 54 are not shown in the drawings.

The reciprocating unit 52 includes a hydraulic cylinder 58 which receives the piston 60 and a package of dished springs 62 tending to move the piston 60 and piston rod 50 in a direction to the right, as viewed in FIG. 5, and to thereby retain a tool holder 26 in the socket 24 of the tool spindle 12.

The left-hand end of the piston rod 50 carries a coupling pin 64 having a flattened head 65 which is receivable in a chamber 75 provided in the cylindrical tip 70 of a conical male coupling portion or plug 72 of each tool holder 26. The chamber 75 is bounded in part by two internal shoulders 66, 68 of the plug 72 which prevent withdrawal of the head 65 in a first angular position of the coupling pin 64. When the piston rod 50 is rotated by the rack 54 through an angle of 90 degrees, the head 65 can be withdrawn through a passage 74 in the tip 70 of the plug 72.

Prior to operation of the tool holder changer 34, the control valve system for the reciprocating unit 52 admits oil or another hydraulic fluid into the cylinder chamber 59 so that the piston 60 moves in a direction to the left, as viewed in FIG. 5, and compresses the springs 62. This causes the piston rod 50 to shift the pin 64 and to move the head 65 away from the shoulders 66, 68. In the next step, the rack 54 is moved lengthwise to rotate the pinion 56 and piston rod 50 through 90 degrees so that the plug 72 can be withdrawn from the socket 24 because the head 65 of the coupling pin 64 registers with the passage 74 in the tip 70. The tool holder 26 is then withdrawn by the grippers 36, 38 or 40, 42 and the socket 24 receives another tool holder which was held ready at the transfer station TS. The freshly inserted tool holder can enter the socket 24 because it is introduced in such angular position that the passage 74 in the tip 70 of its plug 72 registers with the head 65 of the coupling pin 64. The rack 54 is then caused to perform a return stroke and to rotate the piston rod 50 and coupling pin 64 through 90 degrees in order to move the head 65 out of registry with the passage 74. In the final step, the control valve system of the reciprocating unit 52 permits oil to escape from the cylinder chamber 59 so that the springs 62 expand and bias the head 65 against the shoulders 66, 68 whereby the tool holder 26 is coupled to and can rotate with the tool spindle 12. The reciprocating unit 52 is rotatable with the spindle 12 and can receive or evacuate oil through a stationary distributor 51 shown in the lower right-hand portion of FIG. 5. The rack 54 also rotates with the spindle 12.

The support 32 is hollow and accommodates a horizontal shaft 74 forming part of the tool holder changer 34. The shaft 74 is rotatable and reciprocable in a bearing sleeve 76 and its inner (right-hand) end is coupled with the piston rod 78 of a hydraulic reciprocating unit 80 constituting a means for reciprocating the tool holder changer 34. The means for rotating the shaft 74 comprises a rack 82 which is reciprocable by a hydraulic cylinder and piston unit 84 shown in FIG. 2. The rack 82 is normal to the shaft 74 and the latter comprises an elongated pinion 77 which is in constant mesh with the rack 82 irrespective of the axial position of the shaft 74. The units 80, 84 are rigidly mounted in the support 32 and the piston rod 58 may but need not rotate with the shaft 74.

The magazine 30 is rotatable about a vertical axis and comprises a turntable 86 mounted in an annular bearing 88 installed on a plate 90 of the support 32. The plate 90 forms part of a case 92 for a transmission which indexes the turntable 86 through an angle corresponding to the distance between two adjoining spare tool holders 26 on the magazine 30 or through a whole multiple of such angle. The transmission includes spur gears 94, 96, 98 receiving motion from a prime mover here shown as an electric motor 100 which is fixedly mounted on the plate 90 and has an output shaft 102 provided with a pinion which drives the gear 98. The gear 98 drives gears 96, 94 and the latter is coaxially secured to a pinion 104 meshing with a ring gear 106 of the turntable 86.

The turntable 86 carries an annulus of equidistant sockets or receptacles 108 each of which can accommodate the cylindrical tip 70 of a spare tool holder 26. Spring-biased detent pins 112 are adjacent to each socket 108 to normally hold the tips 70 but to yield when the corresponding tool holder 26 is engaged by the grippers 36, 38 or 40, 42 and the shaft 74 is caused to move to the left, as viewed in FIG. 5.

The support 32 further accommodates a hydraulically operated locking device 114 having a piston 116 whose piston rod 118 constitutes a locking bolt and can be introduced into one of a series of equidistant rings 120 mounted on the turntable 86, there being one ring 120 for each socket 108. When the locking bolt 118 extends into one of the rings 120, the turntable 86 is held in an angular position in which a spare tool holder 26 occupies the transfer station TS.

The turntable 86 is surrounded by a stationary cap 122 mounted on a hollow column 124 fixed to the plate 90 of the support 32. The column 124 surrounds the motor 100 of the indexing means for the turntable 86 and further carries a stationary bracket 128 for a signal generating unit 126 adjacent to that spare tool holder 26 which occupies the transfer station TS. The unit 126 is constructed in the same way as disclosed in the aforementioned copending application Ser. No. 587,122 of Gundlich and its purpose is to effect movement of spare tool holders 26 to the transfer station in a predetermined sequence so that a workpiece which is engaged by the tool 28 carried by the tool spindle 12 at the working station WS can be subjected to a series of successive treatments. The unit 126 controls the operation of the motor 100 and locking device 114 and preferably includes a series of Hall effect generators cooperating with permanent magnets installed in the plugs 72 of tool holders 26.

FIGS. 6 to 8 illustrate the construction of parts in and on the housing of the tool holder changer 34. The base or pan 130 of such housing is affixed to and shares all movements of the shaft 74. This pan accommodates and guides the grippers 36, 38 and 40, 42 which are constituted by flattened rods having outer portions receivable in holes 142, 144 provided in a collar 140 of each tool holder 26. In order to insure that the grippers can safely hold and transfer tool holders 26 between the transfer station TS and the socket 24 at the working station WS, they are slightly inclined with reference to each other and the holes 142, 144 are inclined in the same way. FIG. 6 shows that, if the grippers 36, 38 are caused to move upwardly and enter the holes 142, 144 of the collar 140 above the pan 130, the respective tool holder 26 will be compelled to share all movements of the shaft 74. The outer ends of the grippers 36, 38 and 40, 42 travel toward each other when moving away from the pan 130 and away from each other when moving in the opposite direction. The grippers 36, 38 and 40, 42 are mirror symmetrical to each other with reference to a plane which includes the axis of the socket 24 and the axis of the spare tool holder 26 at the transfer station TS when the tool holder changer 34 is held in the starting position of FIG. 6.

The drive means 146 for reciprocating the grippers comprises gears 148, 150, 152, 154 which mesh with racks 156 respectively provided on the inner portions of the grippers 38, 36, 40, 42. The gear 148 meshes with the gear 152 and the gear 150 meshes with the gear 154. A single driving member of the drive 146 is constituted by a rack 158 having two rows of teeth 162, 164 which respectively mesh with pinions 166, 168 coaxially secured to the gears 148, 150. The rack 158 is mounted between the pan 130 and cover 160 and is reciprocable by a double-acting hydraulic cylinder and piston unit 172 having a piston rod 170 which is coupled to the rack. The unit 172 is connected with conduits 174, 176 which are further connected with the shaft 74, the latter being provided with bores 175, 177 shown in FIG. 8 to convey a hydraulic fluid to and from the cylinder chamber of the unit 172. The source of fluid pressure medium which admits and receives fluid from the bores 175, 177 is not shown in the drawings.

The automatic control system for the tool holder changer 34 is shown in FIGS. 7 and 8. It comprises two actuating or tripping devices 178, 180 mounted on the pan 130 and two electric switches 182, 184 mounted on the support 32. Each tripping device comprises two cams or trips 186, 188 which are adjustably secured to and rotate with the shaft 190 of the gear 154 (tripping device 178) and with the shaft 191 of the gear 148 (tripping device 180). The two tripping devices rotate with the shaft 74. FIG. 8 shows that the cam 188 of the device 180 acts upon the switch 182 to terminate the inward movement (retraction of grippers 36–42) by causing the switch 182 to send an appropriate signal to the valve system which regulates the flow of fluid in the bores 175, 177 and conduits 174, 176. If the grippers 36–38 are thereupon moved outwardly, the cam 186 of the tripping device 180 actuates the switch 184 to terminate such outward movement and to initiate radially outwardly directed movement of the shaft 74 so that the tool holders 26 held by the grippers 36, 38 and 40, 42 are withdrawn from the socket 24 and from that socket 108 of the magazine 30 which is adjacent to the transfer station TS. Suitable limit switches (not shown) are provided to arrest the shaft 74 in its outer end position, to start the operation of the unit 84 to rotate the shaft 74, and to effect return axial stroke of the shaft 74 upon completion of a half turn.

A very important advantage of our tool holder changer is that its grippers occupy little room and that such grippers can engage the tool holders while the shaft 74 is at rest. The movements of grippers 36-42 with reference to the pan 130 are substantially radial so that they can satisfactorily engage a spare tool holder 26 even if such spare tool holder is immediately adjacent to additional spare tool holders in the magazine 30. In other words, the distance between the spare tool holders 26 in the magazine 30 depends solely on the dimensions of tool holders and/or their tools 28 but not on the design, dimensions and/or mode of operation of the grippers 36-42. This is believed to constitute a basic departure from presently known tool holder changers whose grippers are constituted by tongs and which require room between the spare tool holders in order to clamp the tool holder which has been indexed to the transfer station.

Another important advantage of the changer 34 is that it can remain in either of its two positions when the grippers 36-42 are retracted because such grippers cannot interfere with rotary movements of the socket 24 at the working station WS and/or with indexing of the magazine 30. The aforementioned conventional tool holder changers must be moved to a further position in which their tongs are moved out of the way and, therefore, such conventional changers must be rotated not only before their tongs start to move into engagement with tool holders but also subsequent to disengagement of tongs from the adjoining tool holders. Such additional rotary movements of tool holder changers consume valuable time and must be initiated and terminated by additional control equipment which occupies considerable space and contributes to initial and maintenance cost of machine tools.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

We claim:

1. A machine tool, particularly a milling machine, comprising a support; a magazine having a plurality of sockets and being indexible with reference to said support to move said sockets to and from a transfer station; an additional socket provided at a second station spaced from said transfer station; a plurality of tool holders each accommodated in one of said sockets and each having a portion receivable in said additional socket; a tool holder changer mounted on said support intermediate said stations for rotation about a predetermined axis and between two positions angularly spaced by 180 degrees, said stations being disposed diametrically opposite each other with reference to said axis and said changer comprising movable first and second gripper means and drive means including a single driving member for moving said gripper means substantially radially of said axis so that each of said gripper means can be moved into and from supporting engagement with a tool holder at one of said stations in each of said positions of the changer, each of said gripper means comprising a pair of elongated grippers and each of said tool holders being provided with two holes arranged to receive portions of such elongated grippers, each of said grippers comprising a rack and said drive means further comprising four gears each meshing with one of said racks, said single driving member being arranged to rotate two of said gears and each of said gears meshing with one of the remaining gears; means for rotating said changer between said positions; and means for reciprocating said charger in the direction of said axis to respectively introduce and remove tool holders from the sockets at said stations while such tool holders are engaged by the respective gripper means.

2. A machine tool as defined in claim 1, further comprising a tool spindle rotatable about a second axis which is parallel to said predetermined axis, said additional socket being provided on and being rotatable with said spindle.

3. A machine tool, particularly a milling machine, comprising a support; a magazine having a plurality of sockets and being indexible with reference to said support to move said sockets to and from a transfer station; an additional socket provided at a second station spaced from said transfer station; a plurality of tool holders each accommodated in one of said sockets and each having a portion receivable in said additional socket; a tool holder changer mounted on said support intermediate said stations for rotation about a predetermined axis and between two positions angularly spaced by 180 degrees, said stations being disposed diametrically opposite each other with reference to said axis and said changer comprising movable first and second gripper means and drive means for moving said gripper means substantially radially of said axis so that each of said gripper means can be moved into and from supporting engagement with a tool holder at one of said stations in each of said positions of the changer, each of said gripper means comprising a pair of elongated grappers and each of said tool holders being provided with two holes arranged to receive portions of such elongated grippers, the grippers of each of said pairs being inclined with reference to each other and comprising outer ends remote from said axis, said outer ends being arranged to approach each other in response to radially outward movement of the respective gripper means; means for rotating said changer between said positions; and means for reciprocating said changer in the direction of said axis to respectively introduce and remove tool holders from the sockets at said stations while such tool holders are engaged by the respective gripper means.

4. A machine tool as defined in claim 3, wherein said drive means comprises a single driving member.

5. A machine tool as defined in claim 1, wherein said two gears mesh with the racks of one pair of said grippers and wherein said driving member is a rack reciprocable between said two gears.

6. A machine tool as defined in claim 5, wherein said drive means further comprises fluid-operated cylinder and piston means for reciprocating said driving member.

7. A machine tool as defined in claim 3, wherein said tool holder changer further comprises a housing for said gripper means and a shaft fixedly secured to said housing and rotatably and axially movably mounted in said support, said shaft having an axis which coincides with said predetermined axis.

8. A machine tool as defined in claim 7, wherein the means for rotating said tool holder changer comprises means for rotating said shaft.

9. A machine tool as defined in claim 7, wherein the means for reciprocating said tool holder changer comprises means for reciprocating said shaft.

10. A machine tool as defined in claim 3, wherein the sockets of said magazine are as closely adjacent to each other as warranted by the dimensions of said tool holders and of tools carried by such tool holders.

11. A machine tool as defined in claim 10, wherein said magazine is indexible about a second axis which is normal to said predetermined axis.

12. A machine tool as defined in claim 11, wherein said second axis is vertical and said transfer station is located at a level above said working station.

References Cited

UNITED STATES PATENTS

| 3,218,706 | 11/1965 | Zaukl et al. | 29—568 |
| 3,327,386 | 6/1967 | Jerue | 29—568 |
| 3,286,344 | 11/1966 | Brainard | 29—568 |

RICHARD H. EANES, JR., *Primary Examiner.*